United States Patent [19]

Perr

[11] 4,410,137
[45] Oct. 18, 1983

[54] MINIATURIZED UNIT FUEL INJECTOR EMPLOYING HYDRAULICALLY CONTROLLED TIMING

[75] Inventor: Julius P. Perr, Columbus, Ind.

[73] Assignee: Cummins Engine Company, Inc., Columbus, Ind.

[21] Appl. No.: 336,332

[22] Filed: Dec. 31, 1981

[51] Int. Cl.³ .................... F02M 45/00; F02M 53/04; F02M 55/00
[52] U.S. Cl. .................................. 239/95; 239/125; 239/132.3
[58] Field of Search .................................. 239/88-91, 239/93-95, 124, 125, 132.3, 132.5, 533.2-533.12, 584

[56] References Cited

U.S. PATENT DOCUMENTS

| | | |
|---|---|---|
| 2,313,264 | 3/1943 | Reggio . |
| 2,863,438 | 12/1958 | Challis . |
| 2,984,230 | 5/1961 | Cummins . |
| 2,997,994 | 8/1961 | Falberg . |
| 3,083,912 | 4/1963 | Shallenberg . |
| 3,351,288 | 11/1967 | Perr . |
| 3,544,008 | 12/1970 | Reiners et al. . |
| 3,557,765 | 1/1971 | Nystrom . |
| 3,847,510 | 11/1974 | Fenne . |
| 3,859,973 | 1/1975 | Dreisin . |
| 3,951,117 | 4/1976 | Perr . |
| 4,249,499 | 2/1981 | Perr . |

FOREIGN PATENT DOCUMENTS

202734 7/1956 Australia .
1080311 8/1967 United Kingdom .

Primary Examiner—Andres Kashnikow
Attorney, Agent, or Firm—Sixbey, Friedman & Leedom

[57] ABSTRACT

A unit injector (200, 300, 400, 500, 600) of the cam actuated, open nozzle type is disclosed including an extremely compact injector body (202, 302, 402, 502) having a minimum number of internal flow passages and a two piece injector plunger (222, 308, 310, 412, 506, 510, 606, 612) arranged to provide pressure/time metering (all embodiments), scavenging fuel flow (all embodiments), hydraulic timing (all embodiments), fuel cut off (embodiments of FIGS. 1, 3 and 4), wear compensation in advance timing mode (all embodiments) and sharp cut off of fuel injection without high "crush" loads and wear compensation in retard and advance modes (embodiment of FIG. 3). All embodiments of this invention are characterized by an injector body (202, 302, 402, 502) having an exterior shape designed to form a fuel supply flow path and an isolated fuel drain flow path between the exterior surface of the injector body (202, 302, 402, 502) and the interior surface of the recess in which the injector (200, 300, 400, 500, 600) is designed to be received. This arrangement allows a very simple pattern of passages (mostly radial passages) to be formed in the injector body.

20 Claims, 13 Drawing Figures

FIG. 2e.
PLUNGER HAS JUST REACHED INNERMOST POSITION

FLUID IN TIMING CHAMBER HAS BEEN EXHAUSTED THROUGH DISCHARGE PASSAGE - FLUID IN INJECTION CHAMBER HAS BEEN INJECTED - SCAVENGING FUEL FLOW IS JUST BEGINNING

FIG. 2f.
REARWARD PLUNGER SECTION IS RECIPROCATING: INNER PLUNGER SECTION IS BEING HELD IN INNER POSITION

TIMING FLUID IS AT BRAKING PRESSURE DOWNWARD FORCE ON INNER PLUNGER SECTION IS GREATER THAN COMBINED FORCE OF EXTENSION SPRINGS

FIG. 5.
RETARD | PLUNGER DOWN ADVANCE

FIG. 6.
RETARD | PLUNGER UP ADVANCE

FIG. 3a.
REARWARD PLUNGER SECTION TRAVEL PROFILE
FULLY ADVANCED
CUP

FIG. 7.

MINIATURIZED UNIT FUEL INJECTOR EMPLOYING HYDRAULICALLY CONTROLLED TIMING

TECHNICAL FIELD

This invention relates to a miniaturized, variable timing fuel injector having a two piece injector plunger mechanically actuated by an engine camshaft.

BACKGROUND ART

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated by the fact that only the more sophisticated, and therefore normally the more expensive, direct injection systems are capable of achieving the increasingly higher performance goals of engine manufacturers.

Up to the present, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, systems of this type generally suffer defects inherent with separation of the injector nozzles from the centralized pump. Unit injector systems avoid the inherent defects of distributor type systems by providing each engine cylinder with its own cam-actuated pump such as disclosed in U.S. Pat. No. 3,544,008. Nevertheless, the performance advantage of unit injectors have generally not outweighed the detriment of greater costs except for heavy duty compression ignition engine applications.

While unit injectors have not normally been employed in low cost fuel systems, numerous refinements have been proposed over the years in an attempt to lessen their cost while retaining their inherent advantages. For example, the assignee of this application, Cummins Engine Company, Inc., has developed an open nozzle, pressure/time unit injector (see U.S. Pat. Nos. 3,351,288 and 3,544,008) which is characterized by the need for only a single supply line (common rail) for supplying fuel to all of the injectors. Because fuel is metered into each injector through a separate feed orifice, the time during which each feed orifice is open and the pressure within the common rail can be relied upon to control the quantity of fuel metered for injection during each injection cycle. Additional cost reductions are realized because an open nozzle unit injector does not require a pressure relief valve at the injection orifice.

While effective in providing cost reductions, certain precautions are usually required in pressure/time, open nozzle injector systems to insure that combustion gases and spurious pressure signals do not enter the fuel supply system. These precautions may include the use of a check valve, upstream from the feed orifice of the injector to discourage combustion gases (known as blowback) from entering the fuel supply. It is also common to provide for scavenging flow of fuel through the injector to remove gases which may have entered the fuel supply line. Scavenging flow additionally serves the function of cooling the injector and would be useful even if it were unnecessary to remove blow-back gases. Thus, a commercially acceptable unit injector, even when designed in accordance with principles intended to simplify the injector structure, is typically a labyrinth of axial and radial drillings. As used in this application, "axial" means parallel with the longitudinal axis of the injector and "radial" means perpendicular to the longitudinal axis of the injector. Moreover, the injector body is usually formed of multiple components requiring very close tolerance controls.

The problem of complexity is further magnified when it is desired to provide a cam operated unit injector with the capability of advancing and/or retarding fuel injection during each injector cycle. U.S. Pat. Nos. 4,249,499 and 3,951,117 provide examples of pressure/time unit injectors which respond to a hydraulic variable pressure signal to control injector timing. Both of these patents disclose unit injectors in which a variable length hydraulic link is inserted into the mechanical actuating train between the engine cam shaft and the injector plunger which reciprocates to force fuel through the injector nozzle. FIGS. 16 and 17 of U.S. Pat. No. 3,951,117 specifically disclose a cam actuated, pressure/time type, open nozzle injector wherein the injector plunger is formed in two sections to create a timing chamber between them. During the metering portion of the injector cycle, fuel is metered into the timing chamber in an amount corresponding to the pressure of the fuel supplied thereto. Numerous other examples of cam actuated unit injectors employing hydraulically variable timing are known such as disclosed in U.K. Pat. No. 1,080,311 and U.S. Pat. Nos. 2,863,438, 3,847,510 and 3,859,973. Hydraulic timing control is also known in other types of fuel injectors such as disclosed in U.S. Pat. No. 3,083,912 wherein a reciprocating piston is subjected to hydraulic pressure against the bias of a coil spring to control injector timing. In addition to purely hydraulic control, mechanical and hybrid mechanical/hydraulic variable timing controls have been applied to cam actuated unit injectors as illustrated in U.S. Pat. Nos. 2,313,264 and 2,997,994. Such mechanical systems tend, however, to increase the overall size and cost of the fuel injection system to say nothing of the possibility for mechanical malfunctions. If other injector capabilities are desired, such as the capability to cut off fuel flow entirely (see U.S. Pat. No. 2,984,230), the structure of the injector will normally become still more complex.

In very simple cam actuated injectors such as illustrated in Australian Pat. No. 202,734, axial drillings have been eliminated from the injector body by forming a flow path between the exterior of the injector body and the interior of the recess in which the injector body is received. By this arrangement, an easily formed radial bore may be provided in the injector body to act as a feed passage from the supply flow path surrounding the injector body into the injector chamber of the unit injector. If the injector is capable of providing a scavenging fuel flow as illustrated in U.S. Pat. No. 3,351,288, the number of necessary flow passages increases and the overall size of the injector must increase to accommodate such passages. Multi-function injectors of this type normally require at least one or more axial passages. Such passages are more difficult and costly to form and have not been eliminated even in injector designs in which the supply and drain lines leading to and from the injector are formed entirely within the engine head such as is illustrated in U.S. Pat. No. 3,351,288.

In short, fuel injectors capable of meeting rigorous operation specifications have invariably been highly complex, costly to manufacture, and/or relatively large in size.

DISCLOSURE OF THE INVENTION

The first object of this invention is to overcome the deficiencies of the prior art described above by providing a fuel injector of greatly simplified design but which is capable of performing a variety of functions including variable timing previously associated only with more complex designs.

The second object of this invention is to provide a highly compact, unit injector formed of multi-function components including an injector body having a minimal number of fluid flow passages and a two piece injector plunger arranged to form a timing chamber between the plunger pieces of sections.

The third object of this invention is to provide a unit injector of simplified design containing a hydraulic timing chamber supplied with timing fluid through an uncomplicated arrangement of flow passages a timing port which is opened and closed by the injector plunger. The timing chamber is formed by inner and outer plunger sections biased together by a spring extending between them. When timing fluid is supplied to the timing chamber at a pressure sufficient to overcome the spring force, the plunger sections are moved apart to form a hydraulic link between the sections and to advance the injection timing.

The fourth object of this invention is to provide a highly compact unit injector designed to perform metering, scavenging and timing functions by means of an extremely simple injector body adapted to form isolated supply, drain and timing flow paths between its exterior surface and the interior surface of the recess within which the injector is received. The respective flow paths are designed to communicate respectively with supply, drain and timing channels formed within the engine head or block within which the injector is received.

The fifth object of this invention is to provide a miniaturized, open nozzle unit injector designed to provide positive end of injection closing of the injection nozzle and to provide prolonged operating life to the injector and the associated cam actuating mechanism. In particular, the injector includes a two-piece injector plunger defining a hydraulic timing chamber between them which chamber fills with timing fluid when the injector timing is advanced. At the end of each injection event, the fluid in the timing chamber is spilled through a restricted drain or discharge to apply controlled pressure to the inner injector plunger when it reaches its innermost position in which the injection nozzle is closed.

Still other and more specific objects of this invention may be understood from an examination of the following Brief Description of the Drawings and Best Mode for Carrying Out the Invention.

BEST MODE FOR CARRYING OUT THE INVENTION

Throughout this application, the words "inward" and "outward" will correspond to the directions, respectively, toward and away from the point at which fuel from an injector is actually injected into the combustion chamber of an engine. To further aid in an understanding of this invention, an index of the elements identified by reference numerals in the drawings is listed at the end of this description of the Best Mode for Carrying Out the Invention.

Figure 1:
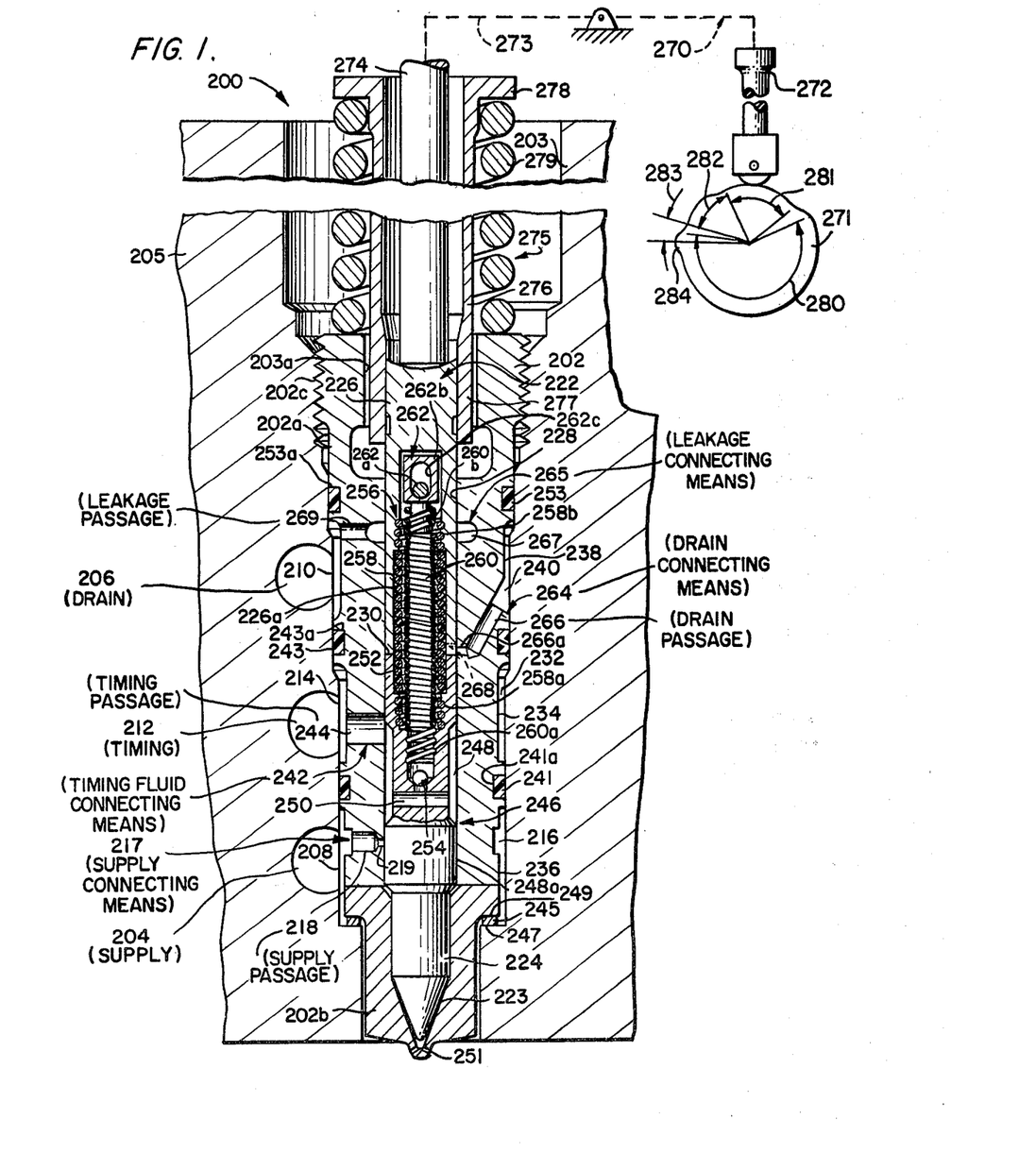
FIG. 1 is a partially broken away, cross-sectional view of an unit injector designed in accordance with the subject invention in which the injector provides both variable timing and a sharp fuel shut off at the end of each injection function.

FIG. 1 illustrates an open nozzle, pressure/time unit injector designed in accordance with the subject invention. In particular, FIG. 1 shows a unit injector 200 including an injector body 202 received in a recess 203 contained in the head 205 (only partially illustrated) of an internal combustion engine. Injector body 202 is actually formed in two sections including an outer section or barrel 202a and inner section or cup 202b which are integrally joined together. As is apparent from FIG. 1, injector body 202 is held within the recess 203 by means of mating screw threads 202c and may be placed in position by means of a wrench adapted to mate with a hexagonal socket 203a contained in the outer end of the injector body 202. Fuel supply and drainage is provided for the injector through passages contained entirely within head 205. In particular, supply channel 204 (sometimes referred to as a common rail) is adapted to supply fuel to the unit injector 200 while drain channel 206 is adapted to receive fuel discharged from the injector for return to the fuel supply system. Both supply channel 204 and drain channel 206 may be formed to communicate with each of a plurality of injectors positioned within head 205 to eliminate all external flow passages to and from the injectors contained in the engine head. In addition to the fuel supply channel 204 and fuel drain channel 206, which communicate with recess 203 through supply port 208 and drain port 210, respectively, an additional timing channel 212 is formed in the engine head intermediate the drain and supply channels to provide timing fluid to each of the injectors within the engine head. This timing channel 212 communicates with recess 203 through a timing port 214.

The exterior surface of injector body 202 is shaped to provide three annular recesses 236, 234 and 238 axially spaced to communicate with channels 204, 212 and 206 through supply ports 208, timing port 214 and drain port 210, respectively. By this arrangement, a supply flow path 216 is formed between supply port 208 and the exterior surface of the injector body 202 defining recess 236. Similarly, a drain flow path 240 is formed between drain port 210 and the exterior surface of the injector body 202 which defines annular recess 238. A timing fluid flow path 232 is formed by annular recess 234 placed between supply flow path 216 and drain flow path 240. In order to isolate supply flow path 216 from timing flow path 232, a circumferential seal 241 is positioned between injector body 202 and the interior surface of recess 203. As is apparent from FIG. 1, the circumferential seal 241 is positioned within a small annular groove 241a located between annular recesses 234 and 236. A similar type of circumferential seal 243 is positioned within a second small annular groove 243a located between annular recesses 234 and 238 to insure against fuel leakage between the timing flow path 232 and the drain flow path 240. The inner end of supply flow path 216 is sealed by means of a washer-like seal element 245 compressibly held between an inwardly directed lip 247 formed in recess 203 and a radially outwardly directed surface 249 formed on injector body 202. An outer circumferential seal 253 received in small annular groove 253a on the injector body 202 above (as illustrated in FIG. 1) annular recess 238 serves to seal the drain flow path 240 against outward leakage of fuel.

Injector body 202 contains a central bore 228 which is coaxial with the longitudinal axis of the injector body 202. At the inner (lower) end of the injector body 202, one or more small injection orifices 251 are contained to provide a communication path between central bore 228 and a combustion chamber. Fuel is supplied through injection orifices 251 to the combustion chamber by the injector in controlled synchronism with the operation of the corresponding cylinder piston (not illustrated). Positioned within central bore 228 is an injector plunger 222 adapted to reciprocate in response to a cam-actuated mechanism 270 including a specially profiled cam lobe 271, connected to the conventional cam shaft (not illustrated) of the engine, a push rod 272, rocker arm 273 and a link 274. Because cam lobe 271 rotates in a fixed manner relative to the reciprocating motion of the cylinder piston, plunger 222 may have its reciprocating motion very precisely controlled with respect to the cylinder piston by carefully shaping the profile of cam lobe 271. Cam mechanism 270 may be of the type which employs a stepped cam to hold, during a sustained portion of each injection cycle just prior to injection, the injector plunger in an inward position in which the feed orifice of the injector is closed to prevent combustion gas blow back. A cam-actuated mechanism of this type is disclosed in the commonly assigned application of Les Peters entitled Fuel Injector Assembly Including a Blow-Back Prevention Cam Ser. No. 336,334 filed Dec. 31, 1981. The entire disclosure of that application is incorporated by reference.

Essentially, injector plunger 222 reciprocates between an innermost position in which injection orifices 251 are closed by the forward end 223 of plunger 222 and an outermost position in which an injection chamber is formed within central bore 228 between the forward end 223 and the injection orifices 251. Since this invention relates to injectors of the "open nozzle" type, orifices 251 remain open to the combustion chamber whenever injector plunger 222 is retracted from its innermost position. Injectors of this type have an inherent cost advantage over more complex closed nozzle injectors which employ a pressure released tip valve for maintaining the injection orifice in a closed condition except during the injection event. Injection plunger 222 is permanently biased toward its outermost position by a plunger return means 275 including a sleeve like coupler 276 connected at its lower end 277 to the upper end of injection plunger 222. A radially, outwardly directed flange 278 is positioned adjacent the topmost portion of coupler 276. A fairly high pressure compression spring 279 extends between the upper end of injector body 202 and flange 278 to continually bias plunger 222 in the outer direction.

To control the amount of fuel injected during each forward movement of injector plunger 222, the subject injector is provided with a "pressure/time" injection capability in which fuel is metered into the injection chamber before each injection stroke through a fill or feed orifice which has been carefully dimensioned to allow the amount of fuel injected to be varied within a given amount of time by varying the supply line (common rail) pressure. Thus, the amount of fuel actually metered is a function of the supply pressure and the total metering time during which fuel flows through the feed orifice. This principle is applied to the subject unit injector by provision of a supply connecting means 217 for providing a pathway for fuel under pressure to flow from the supply flow path 216 into a section of the central bore 222 which forms the injection chamber. The supply connecting means 217 includes a supply passage 218 extending from the exterior surface of the injector body 202 to the interior surface of the central bore 222 along a straight radial path perpendicular to the longitudinal axis of the injector body 202. A restricted portion of supply passage 218 forms a feed orifice 219 which has carefully controlled hydraulic characteristics in order to produce the desired pressure/time metering capability discussed above.

The amount of time which the injector plunger 222 dwells in either the innermost or outermost position depends in part upon the profile of cam lobe 271. As is apparent from FIG. 1, a preferred design for cam lobe 271 includes one sector 280 comprising more than 180° of the total circumference. This sector causes the injector plunger to assume its innermost position. A second sector 281, comprising almost 90° of the total circumference, causes plunger 222 to assume its outermost position.

Separating first sector 280 and second sector 281 is a third sector 282 which functions to move the injector plunger 222 to a supply passage blocking position in which the injector plunger 222 is moved inwardly sufficiently to close off feed orifice 219 but does not move the injector plunger 222 sufficiently to actually initiate fuel injection. Third sector 282 is shaped to cause feed orifice 219 to be closed during the time that combustion chamber pressures are rising to a sufficiently high level to cause significant blow back of combustion gases into the fuel supply line. A fourth small sector 283 of the cam lobe 279 represents approximately that portion of the cam lobe 271 which causes actual fuel injection. The point at which injection begins is approximate since it depends in part upon the amount of fuel metered into the injection chamber during each cycle.

First sector 280 engages the lower end of push rod 272 at the point just before the engine piston executes its power stroke and continues to engage push rod 272 throughout the exhaust stroke and a portion of the intake stroke of the piston. Second sector 281 engages rod 272 approximately halfway through the intake stroke of the piston and ceases to engage rod 272 approximately halfway into the compression stroke. Second sector 281 defines the time during each injector cycle when fuel is metered into the injection chamber. Third sector 282, which causes the injector plunger 222 to move toward its innermost position sufficiently to close the feed orifice 219 but not to cause injection, is positioned to engage push rod 272 approximately halfway through the compression stroke and to continue this engagement up to the point at which injection commences. The fourth small sector 283 is that portion of cam lobe 271 which causes injector plunger 222 to move from its outermost position to its innermost position to force the metered fuel in the injection chamber through injection orifices 251 into the combustion chamber of the engine. A slightly raised dimple 284 exaggerated in FIG. 1 is formed on cam lobe 271 near the end of fourth sector 283 to place a "crush load" on injector plunger 222 at the end of the injection event in order to hold the injector plunger 222 tightly against the injector cup 202b. This ability to hold injector plunger 222 very tightly against the injector cup 202b insures that injection orifices 251 will be sharply closed and will remain closed at the end of each injection period even during the retard mode of operation of the injector embodiment of FIG. 1. An essential characteristic of the injector of FIG. 1 is that it allows the fuel injection event to be advanced relative to the movement of the associated engine piston by the simple expedient of varying the pressure of a timing fluid supplied through the timing fluid channel 212. Since all of the engine injectors are in communication with the same timing channel, a very simple control may be provided to change the timing of all of the engine injectors.

To permit this adjustment in timing, the injector plunger 222 of each injector is formed in two sections including an inner plunger section 224 and an outer plunger section 226. The two sections are independently mounted within the central bore 228 of the injector body 202 to form a variable volume timing chamber 230 (illustrated in its fully collapsed condition). Timing fluid is supplied to chamber 230 by the timing fluid flow path 232.

Timing fluid flows into the central bore 228 through a timing fluid connecting means 242 which provides a pathway for fuel flow from the timing fluid flow path 232 into the central bore 228. The timing fluid connecting means 242 includes a timing passage 244 extending from the exterior surface of the injector body 202 to the interior surface of the central bore 228 along a straight radial path perpendicular to the longitudinal axis of the injector body 202. The exterior surface of inner plunger section 224 is shaped to form a flow control means 246 for controlling the flow of fuel and timing fluid within the injector. In particular, the flow control means 246 includes an annular groove 248 axially positioned to communicate at all times with timing passage 244. Flow control means 246 further includes a transverse passage 250 in the inner portion of annular groove 248 to communicate at its ends with the space formed by annular groove 248 within central bore 228. The outer end of inner plunger section 224 contains a recess 252 at the bottom of which is a ball-type check valve 254 designed to allow one way fluid flow from the transverse passage 250 into the recess 252. It should be apparent from FIG. 1 that recess 252 communicates directly with the variable volume timing chamber 230 in a manner to permit the flow of timing fluid through timing passage 244, annular groove 248, transverse passage 250, check valve 254 and recess 252. Flow control means 246 on inner plunger section 224 also includes a cylindrical land 248a which sealingly engages the interior surface of central bore 228 to seal the space within central bore 228 defined by annular groove 248 from the injection chamber of the injector. As illustrated in FIG. 1, cylindrical land 248a is axially positioned to open and close feed orifice 219 in the manner described above.

Biasing means 256 is provided for continuously biasing the inner and outer plunger sections together. Biasing means 256 includes first helical extension spring 258 connected integrally at each end, respectively, to the plunger sections to apply at all times at least a first predetermined force tending to bring the plunger sections together. A second helical extension spring 260 mounted coaxially within the first extension spring 258 is connected at one end to inner plunger section 224 and at the other end to outer plunger section 226 by a lost motion connection means 262 to cause the second extension spring to apply a second predetermined force tending to bring the plunger sections together whenever the plunger sections are separated by more than a predetermined distance defined by the lost motion connection means 262. As illustrated in FIG. 1, lost motion connection means 262 is positioned with an inwardly opening recess 226a formed in outer plunger section 226. The lost motion connection means 262 includes a pin 262a extending through recess 226a generally perpendicular to the longitudinal axis of the outer plunger section 226. The ends of pin 262a are fixed in the same manner, such as by press fitting, to the adjacent portion of outer plunger section 226. Held within recess 226a by pin 262a is an anchor element 262b containing an elongated opening 262c which receives pin 262a. Obviously, the axial length of opening 262c defines the relative movment which may take place between outer plunger 226 and anchor element 262b when the injector plunger sections move from the position illustrated in FIG. 1 to a position in which second helical spring 260 will begin to apply a force on the plunger sections tending to pull the sections together. It is thus the axial length of opening 262c which defines the "lost motion" which may occur between the plunger sections before spring 260 becomes effective. The end of extension spring 258 are connected by means of helical screw threads 258a and 258b to inner and outer plunger sections 224 and 226 respectively. Similarly, the ends of spring 260 are connected by screw threads 260a and 260b of the inner plunger section 224 and anchor element 262b. To prevent relative rotation of the plunger sections, the springs 258 and 260 are wound in opposite directions.

The unit injector illustrated in FIG. 1 includes a drain connecting means 264 for providing a pathway for fuel flow from the central bore 228 into the drain flow path 240 and a leakage connecting means 265 for providing a pathway for fuel leaked outwardly from the timing chamber 230 to flow into the drain flow path 240. The leakage connection means 265 includes an annular cavity 267 extending radially outwardly from the central bore 228 and a leakage passage 269 extending from the annular cavity 267 to the drain flow path 240. The drain connecting means 264 further includes a drain passage 266 extending obliquely from the central bore 228 to the exterior surface of annular recess 238. The point of communication between drain passage 266 and central bore 228 occurs at the axial location defined by the point of contact between the plunger sections when the inner plunger section 224 is in its innermost position as illustrated in FIG. 1. The innermost end of outer plunger section 226 includes radial passages or grooves 268 (illustrated in dashed lines) which are arranged to provide a fluid communication path for timing fluid to exit from the variable volume timing chamber 230 when the inner plunger section 224 is in its innermost position. Passage 266 includes a restricted portion 266a which operates to control the rate at which fluid is spilled from the timing chamber 230 as will be explained below.

Figure 2A:
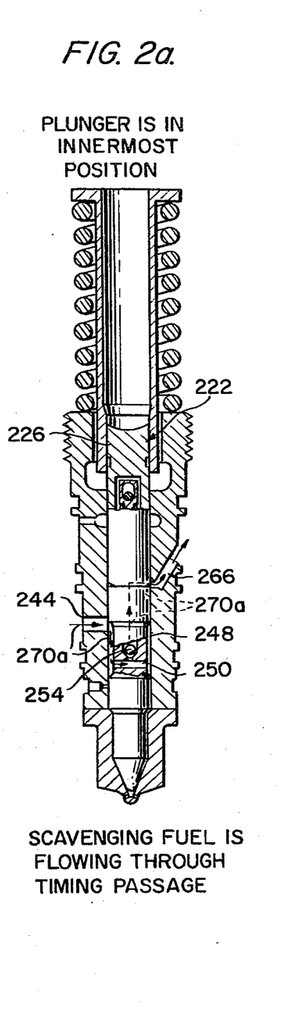
FIGS. 2a -2f are cross-sectional views of the unit injector of FIG. 1 operating in different phases.

The operation of the unit injector illustrated in FIG. 1 will now be explained with reference to FIGS. 2a-2f. In FIG. 2a, a cam actuating mechanim (not illustrated) has moved the injector plunger 222 to its innermost position in which all fuel metering has been cut off but timing fluid is flowing through the injector to provide one of the normal scavenging functions. In particular, the scavenging flow in the embodiment functions primarily to cool the injector. This function occurs when timing fluid, which may be fuel, enters the timing passage 244 and flows through annular groove 248, transverse passage 250, check valve 254, recess 252 (not illustrated) and grooves 268 to exit through drain passage 266. Because the cam actuating mechanism causes outer plunger section 226 to be held in its innermost position, the timing chamber 230 may not expand from its fully collapsed condition. The scavenging (cooling) flow path is illustrated by arrows 270a.

Figure 2B:
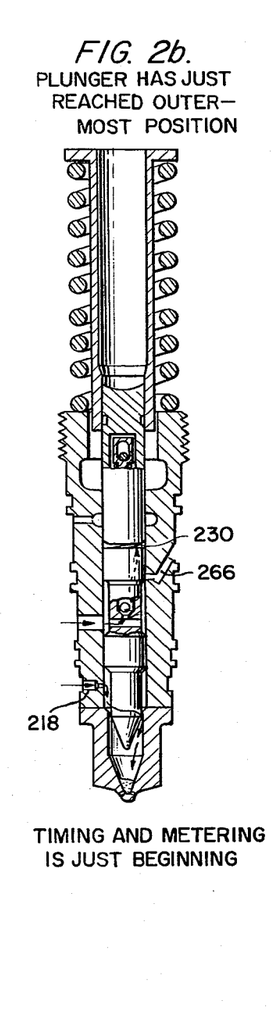
Figure 2C:
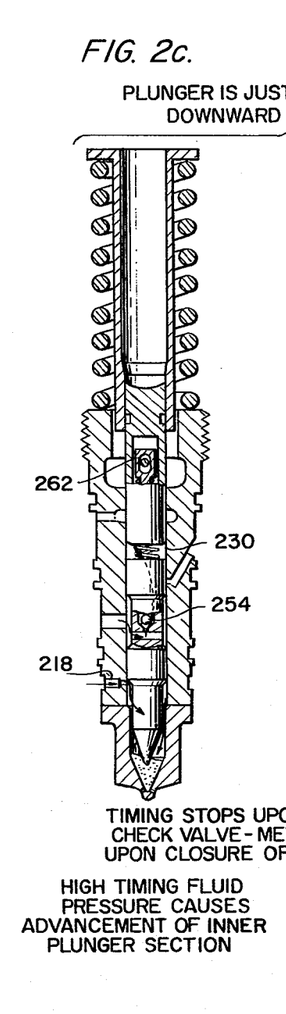
Figure 2D:
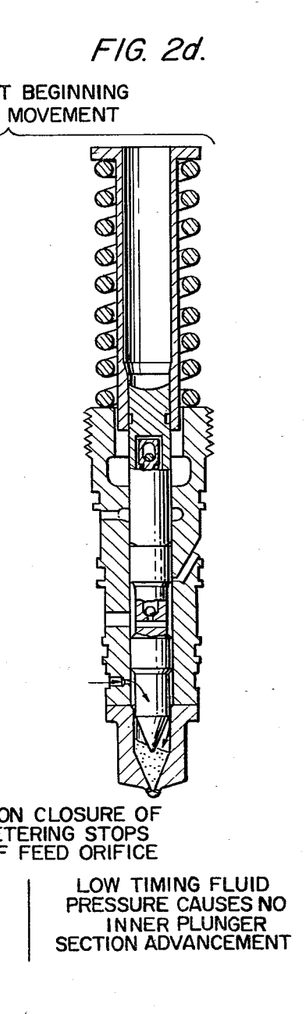

FIG. 2b shows the phase of injector operation in which the plunger has been moved to its outermost position to open the supply passage 218 and close drain passage 266 to begin to trap timing fluid within the variable volume timing chamber 230. In FIG. 2b both timing and metering have just commenced. Accordingly, very little fuel has been metered into the injection chamber. As disclosed above, metering is in accordance with pressure/time principles. Timing fluid flows into chamber 230 when the injector is in the phase illustrated in FIG. 2c only if the timing fluid pressure is sufficient to overcome the preload tension applied to the plunger sections by extension spring 258. FIG. 2c shows the effect of such a sufficiently high timing pressure having been applied at the movement that the injector plunger commences it inward movement. At this time, check valve 254 operates to trap the timing fuel within the timing chamber 230 to form a hydraulic link between the inner and outer plunger sections. If the timing pressure has not been sufficiently high, no expansion of the timing chamber 230 will have taken place as illustrated in FIG. 2d. It can, thus, easily be seen that the moment of fuel injection may be advanced by expanding the variable volume timing chamber 230 on a cycle by cycle basis. As long as the timing fluid pressure within chamber 230 does not exceed the combined tension force applied by the first and second extension springs 258 and 260, the maximum amount by which the timing chamber can be expanded is limited by the lost motion defined by lost motion connection means 262. While not contemplated for the preferred embodiments of this invention, timing advance could be made infinitely variable by operating the timing on the pressure/time principle. For example, the check valve opening could be carefully sized to limit the amount of fluid entering chamber 230 dependent upon the pressure of the timing fluid and the length of time that the injector is in the phase illustrated in FIG. 2c. Alternatively, the amount of timing advance could be made to depend on the precise pressure of the timing fluid along independent of the timing period.

Figure 2E:
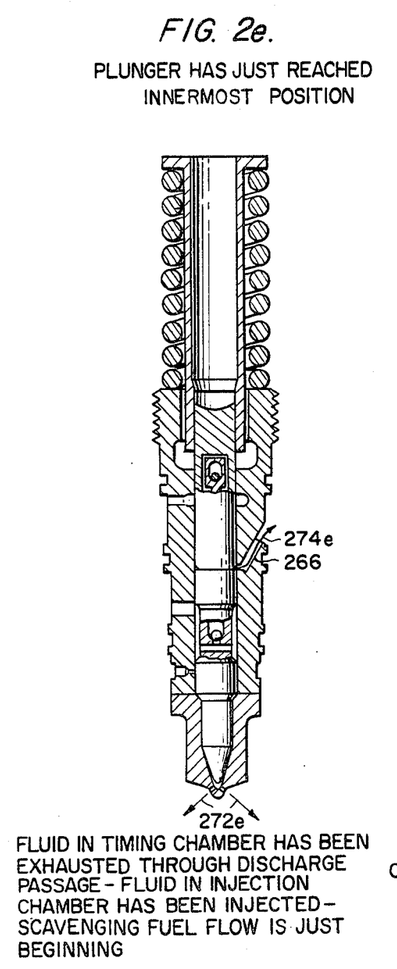

In FIG. 2e, the injector is shown in the condition assumed as the plunger reaches its innermost position. In moving from the condition illustrated in FIG. 2c to that illustrated in FIG. 2e, all of the fuel metered into the injection chamber is expelled through the injection orifice as illustrated by arrows 272e and any timing fluid metered into chamber 230 is expelled through the drain passage 266 as illustrated by arrow 274e. Thus, drain passage 266 also forms a timing fluid discharging means for providing a pathway for timing fluid to flow from the timing chamber 230 into the drain flow path 240. Accordingly, drain passage 266 also serves as a discharge passage for timing fluid.

Figure 2F:
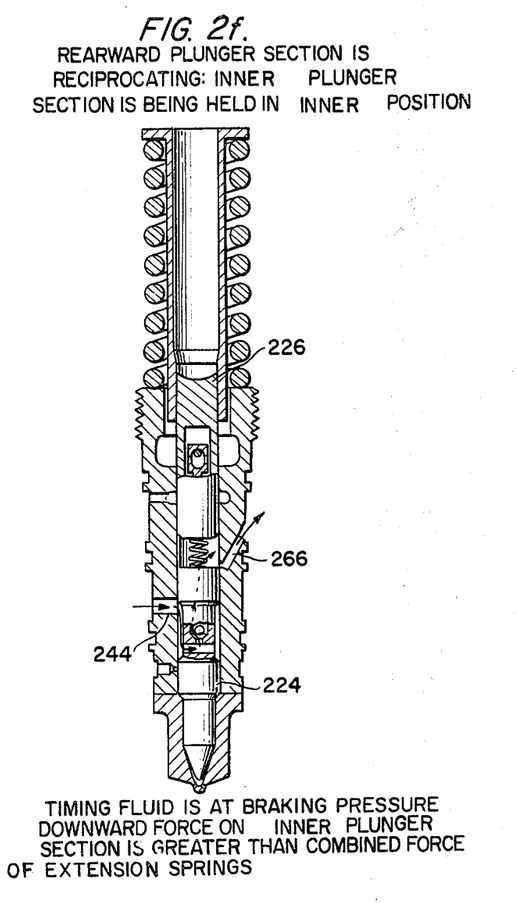

During certain modes of engine operation, such as engine braking in which the engine is used to provide a braking function, it is often desirable to completely cut off all fuel injection. This function may be performed by substantially increasing the timing fluid pressure to a level such that the pressure within the variable timing chamber 230 exceeds the tension force applied by the first and second extension springs 258 and 260 thereby causing the inner plunger section 224 to remain in its innermost position while the outer plunger section 226 reciprocates under operation of the cam actuating mechanism. In this situation, timing fluid will flow into the timing chamber 230 during upward movement of the inner plunger section 224 and will be expelled through drain passage 266 upon downward movement of plunger 222.

It is now apparent that the unit injector embodiment of FIGS. 1 and 2 is capable of performing a variety of injector functions which have heretofore required a much greater number of injector components. In particular, this embodiment provides a pressure/time fuel metering function and a timing function as well as a cooling flow function using the timing fluid as a source of cooling fluid. The injector of FIG. 1 may also be operated to completely cut off fuel injection despite continued engine operation and reciprocation of the cam actuating mechanism.

Figures 3, 4:
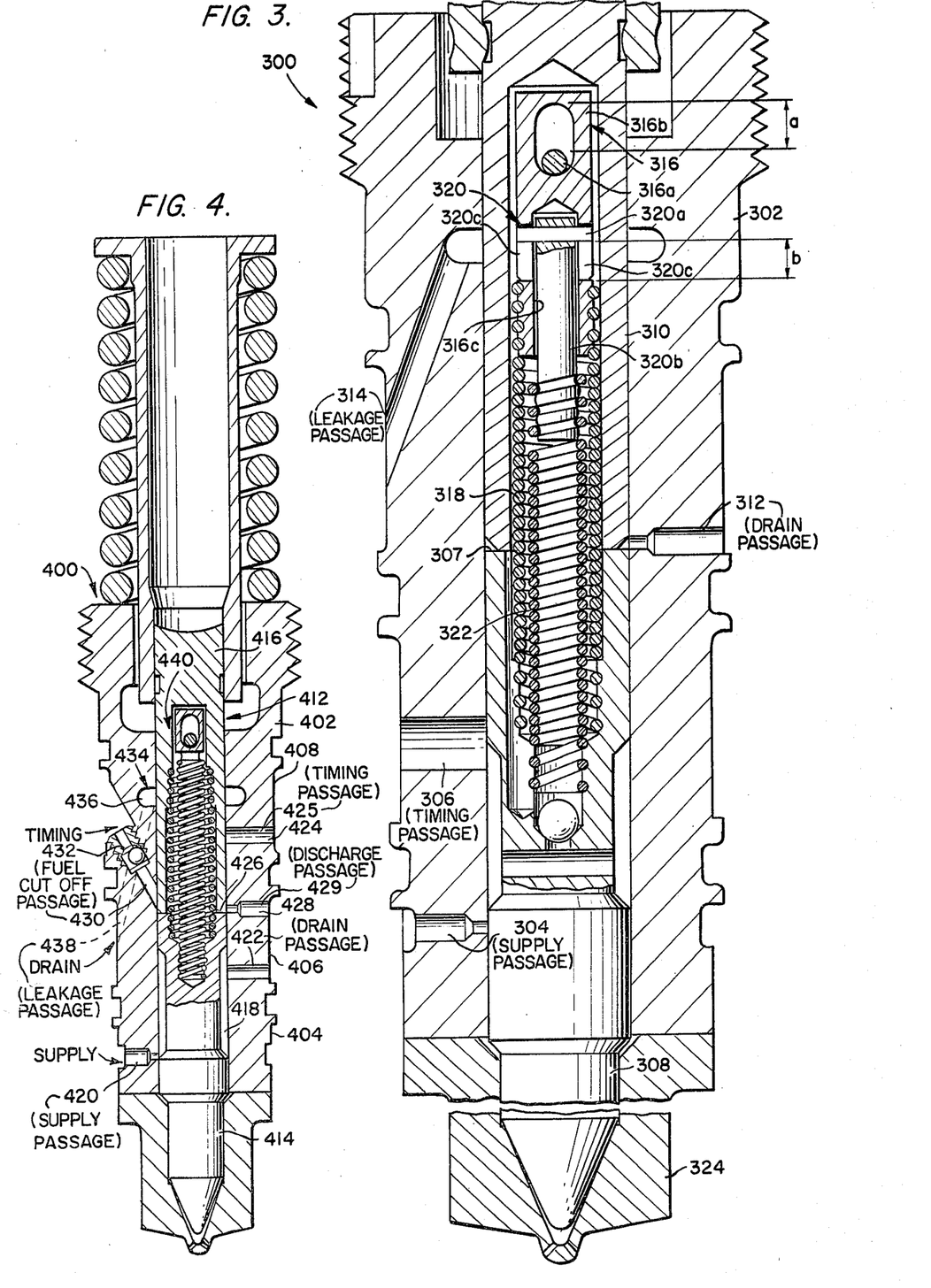
FIG. 3 is a cross-sectional view of another embodiment of the subject invention in which a wear compensation function and a sharp end of injection function during the retard mode of operation have been added to the injector design of FIG. 1.
FIG. 4 discloses yet another embodiment of an unit injector designed in accordance with the subject invention to provide both variable timing and fuel cut off capabilities wherein the timing and drain passages have been reversed axially from the configuration illustrated in FIGS. 1 and 3.

FIG. 3 illustrates another embodiment of the subject invention in which wear compensation and a sharper end of injection capability (even when the injector timing is not advanced) have been added to the injector design of FIGS. 1 and 2a-2f by the inclusion of a second lost motion connection means. In particular, FIG. 3 illustrates an injector unit 300 including an injector body 302 formed in a manner similar to the injector body 202 of FIG. 1. The supply passage 304 and timing passage 306 are formed to function in the same manner as the corresponding passages in the embodiment of FIG. 1. However, the length of the inner plunger section 308 and outer plunger section 310 have been adjusted to cause the axial location of the variable volume timing chamber 307 to be moved axially outwardly (upwardly) to permit a dual function drain and discharge passage 312 to be formed in the injector body 302 along a radial path perpendicular to the longitudinal axis of the injector body 302. Leakage passage 314, however, is now formed obliquely with respect to the injector body 302.

A major difference between the embodiment of FIG. 3 versus the embodiment of FIG. 1 is the inclusion of an additional lost motion connection means 316 between the outer (upper end) of the first extension spring 318. By this arrangement, the plunger sections 308 and 310 will always undergo a predetermined separation during each injection cycle to define a minimum overtravel distance 'a' determined by lost motion connection means 316 (which may be considered the first lost connection means). Only after the plunger sections 308 and 310 are separated by the overtravel distance 'a' will first extension spring 318 begin to apply its preload tension to bias the plunger sections together. In a manner similar to the operation of the embodiment of FIG. 1, the second lost motion connection means 320 prevents second extension spring 322 from applying any additional biasing force to the plunger sections until the sections are separated by an additional "advance" distance 'b' determined by the characteristics of the second lost motion connection means 320.

First lost motion connection means 316 includes a pin 316a and anchor element 316b similar to the pin and anchor element of the embodiment of FIG. 1 except that anchor element 316b is directly connected by screw threads to the outer end of first spring 318 rather than the second spring 322. The second lost motion connection means 320 includes a second pin 320a and second anchor element 320b positioned within a downwardly opening recess 316c contained in anchor element 316b. Pin 320a is fixed to anchor element 320b and the outer ends thereof are held within longitudinally oriented slots 320c contained in anchor element 316b. Thus, the axial length of slots 320c define the amount of lost motion which may occur between anchor elements 316b and 320b before second spring 322 begins to apply a tension force which tends to pull the plunger sections together.

Figure 3A:
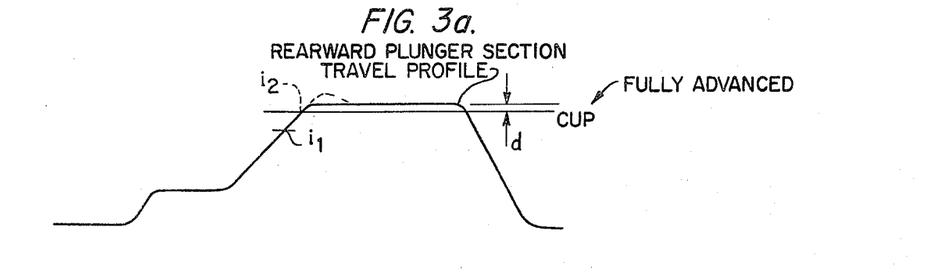
FIG. 3a is a chart which illustrates how the injector embodiment of FIG. 3 is capable of achieving a sharper end of injection.

The functional benefits which derive from provision of the second lost motion connection means 320 can best be understood by reference to FIG. 3a in which the travel profile of outer (upper) plunger section 310 is plotted against degrees of cam rotation when the injector is operating in the retard mode, that is when the timing fluid pressure is insufficient to overcome the preload tension on spring 318 and thus the plunger sections are only separated by the distance 'a' defined by lost motion connection means 316. The sections become separated by the distance 'a' because a predetermined minimal pressure is always provided by the timing fluid. In response to this minimal pressure, the timing chamber 307 formed between sections 308 and 310 will always expand as the outer plunger section 310 moves outwardly. This minimal fluid timing pressure will not, however, overcome the preload tension in spring 318. Upon inner movement of the injector plunger sections by a cam (profiled, for example, like the cam of FIG. 1), the inner plunger section 308 will naturally reach the cup 324 of the injector body 302 before the outer plunger section 310 has reached its innermost position. This fact is shown by point $i_1$ in FIG. 3a, which shows that the outer plunger section 310 is still traveling in an inner direction when the inner plunger section 308 reaches the injector cup 324 to close off the injection orifice. At this time, the timing fluid trapped in the expanded timing chamber 307 is expelled through drain passage 312 at very high pressure to maintain the inner plunger section 308 in its innermost position. This mode of operation contrasts with the retard mode (non-advanced mode) of operation of the FIG. 1 embodiment in which the variable volume chamber 230 is fully collapsed before the forward plunger section 244 reaches the injector cup. This is illustrated by point $i_2$ in FIG. 3a. Because point $i_1$ occurs along a higher velocity portion of the travel profile, the inner plunger section 308 engages the injector cup 324 at a higher velocity than does the inner plunger section 224 of FIG. 1 to produce thereby a sharper end of fuel flow during injection. Moreover, the need for dimple 284 on the cam profile no longer exists since the timing fluid within the timing chamber insures that the inner plunger section 308 will be held tightly against the injector cup during the final stages of inward movement of the outer plunger section 310. FIG. 3a shows only a minimal overtravel 'd' of 0.018 inches after the plunger sections are brought into contact but before the outer plunger 310 reaches its innermost position. This arrangement allows elimination of the dimple 284 of the FIG. 1 cam profile which would have resulted in the additional overtravel of outer plunger 310 as illustrated by the dashed lines in FIG. 3a. Naturally, cam life is increased when the "crush load" created by dimple 284 can be eliminated. An additional benefit of the embodiment of FIG. 3 is that any wear which takes place in the injector actuation train is automatically compensated for by the creation of a minimal hydraulic link during the retard mode of injector operation.

Yet another embodiment of the subject invention is illustrated in FIG. 4 wherein a unit injector 400 is illustrated including an injector body 402 having three axially spaced recesses 404, 406 and 408 formed on the exterior thereof in axially spaced relationship. The innermost recess 404 serves to form a fluid supply path with the recess in which the injector is adapted to be placed. The middle recess 406 is adapted to form a fuel drain flow path communicating with a drain port (not illustrated) opening into a recess within which the injector is adapted to be placed. Finally, outer recess 408 forms a timing fluid flow path communicating with a timing port (not illustrated) which also opens into the recess within which the injector 400 is adapted to be placed. Thus, it can be seen that the timing channel and drain channel for use in combination with the embodiment of FIG. 4 has been reversed from the position illustrated in FIGS. 1 and 3.

The injector plunger 412 is formed in two sections including an inner plunger section 414 and an outer plunger section 416 defining a variable volume timing chamber 426 between them. The plunger sections 414 and 416 are biased together by a biasing means including first and second coaxial extension springs and a lost motion connection means identical to that used in the embodiment of FIG. 1.

On the exterior of inner plunger section 414, an annular groove 418 is formed to communicate with supply passage 420 when the inner plunger section 414 is in its innermost position as illustrated in FIG. 4. A drain passage 422 is formed to communicate with the fuel drain flow path formed by recess 406. Both the supply passage 420 and drain passage 422 are perpendicular to the longitudinal axis of the injector and thus are very easily manufactured. As constructed in the manner illustrated in FIG. 4, the unit injector 400 operates with regard to fuel metering and injection in a manner identical to that of the FIG. 1 embodiment of this invention. For purposes of advancing timing, however, timing fluid connecting means 424 is provided for forming a pathway for timing fluid to flow from the timing fluid flow path formed by recess 408 into the variable volume timing chamber 426 formed between inner and outer plunger sections 414 and 416. The timing fluid connecting means 424 includes a timing passage 425 extending from the exterior surface of the injector body to the interior surface of the central bore along a straight radial path perpendicular to the longitudinal axis of the injector body 402. Again, by this arrangement, only a minimal manufacturing expense is involved in forming the timing passage.

Scavenging takes place when the plunger 412 is in its innermost position as illustrated in FIG. 4 to allow fuel to flow through supply passage 420, annular groove 418 and drain passage 422. Scavenging thus takes place in the same manner as described in the co-pending, commonly assigned, application of Les Peters entitled "Fuel Injector Assembly Including Blow-Back Prevention Cam".

As is apparent from FIG. 4, the variable volume timing chamber 426 is fully collapsed. However, when the injector plunger 412 is in its outermost position, the variable volume chamber 426 comes in communication with the timing passage 425. In the time that the inner injector plunger 416 is held in its outermost position, timing fluid may pass into the variable volume timing chamber 426. In the embodiment of FIG. 4, the amount of fluid which flows into the timing chamber 426 is a function solely of the lost motion connection distance defined by the lost motion connection means 440 which operates in the same manner as the lost motion connection means 262 of FIG. 1. When the inner plunger section 414 is moved to its innermost position, the variable volume timing chamber 426 will be positioned to communicate with a timing fluid discharging means 428 for providing a pathway for timing fluid to flow from the timing chamber 426 into the drain flow path formed by recess 406. By this arrangement, the timing chamber collapses completely during each cycle of the injector. Means 428 includes a discharge passage 429 which is shaped like the drain passage 312 of FIG. 3. Thus, in the embodiment of FIG. 4, the function performed by drain connecting means 264 of FIG. 1 (i.e., spilling timing fluid and discharging scavenging fuel flow) requires both timing passage 425 and drain passages 422.

To provide the braking mode fuel cut off function referred to with respect to the embodiment of FIG. 1, the injector body 402 includes a fuel cut off passage 430 extending obliquely from the exterior surface of the injector body 402 defined by recess 408 to the central bore of the injector body 402 at an axial position which allows flow of timing fluid into the timing chamber 426 when the inner plunger section 414 is in its innermost position. Thus, upon increase of the timing fluid pressure by an amount which allows the force within chamber 426 to exceed the combined force applied by the pair of extension springs forming the plunger biasing means referred to above, the inner plunger section 414 will be held in its innermost position while the outer plunger section 416 will reciprocate under the control of the cam actuating mechanism (not illustrated).

A check valve means 432 is provided in the fuel cut off passage 430 for permitting timing fluid to flow only one way through the fuel cut off passage 430 into the timing chamber 426. Check valve means 432 insures that a hydraulic link is maintained at all times between the injector plunger sections 414 and 416 during the inward stroke of the plunger until the inner plunger section 414 reaches its innermost position.

To insure against possible leakage of fuel which may seep upwardly between the injector plunger and a central bore of the injector body 402, a leakage connecting means 434 is provided for forming a pathway for leaked fuel to flow into the drain flow path formed by recess 406. The leakage connecting means 434 includes an annular cavity 436 extending outwardly from the central bore at a point above the uppermost limit reached by the variable volume timing chamber 426 and a leakage passage 438 extending from the annular cavity to the drain pathway formed by recess 406.

It should now be clear that the embodiment of FIG. 4 operates in a manner similar to the embodiment of FIG. 1 with respect to fuel metering and with regard to the timing chamber except that timing fluid is provided to the variable timing chamber 426 only upon the outer plunger section 416 reaching the axial position of passage 425 whereas in the embodiment of FIG. 1 timing fluid is supplied at all times to the variable volume chamber.

Figure 5:
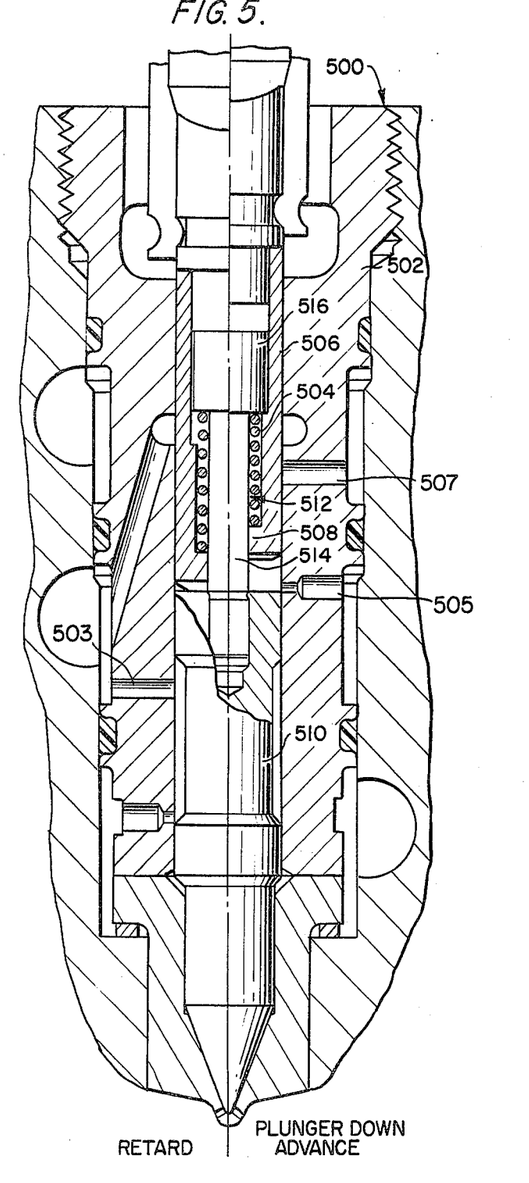
FIG. 5 is a split cross-sectional view of still another embodiment of a unit injector designed in accordance with the subject invention wherein the injector plunger sections are biased together by a compression spring.
Figure 6:
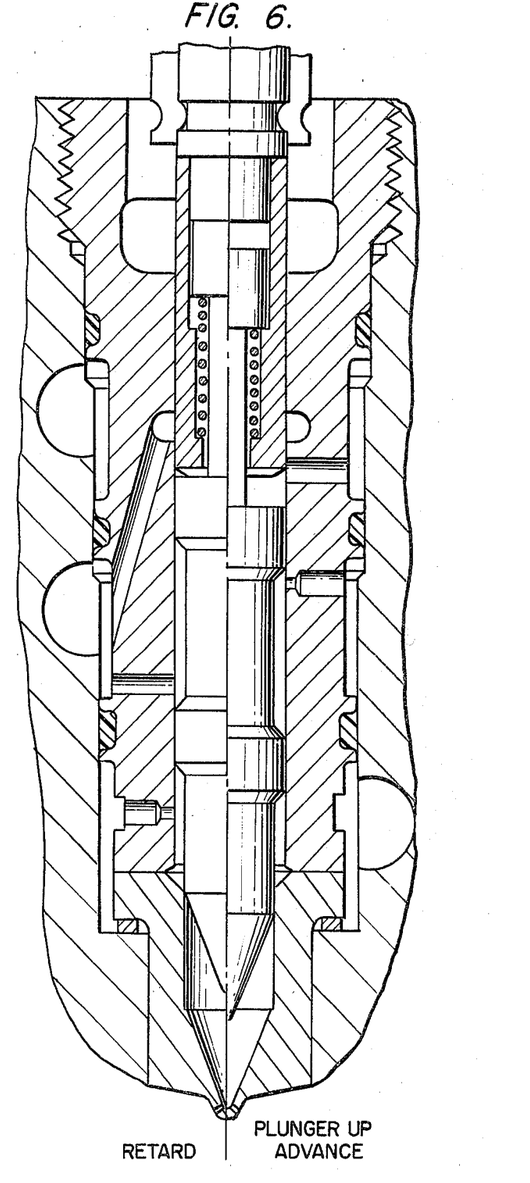
FIG. 6 illustrates a split cross-sectional view of the unit injector of FIG. 5 in which the injector plunger is shown in two alternative conditions.

Reference is now made to still another embodiment of the unit injector designed in accordance with the subject invention illustrated in FIGS. 5 and 6. FIG. 5 illustrates a unit injector 500 having an injector body 502 similar to the injector body 402 illustrated in FIG. 4. In particular, passage 507 operates in the same manner as timing passage 425. The main difference is that the fuel cut off passage has been eliminated and the drain passage 503 has been moved to the opposite side of the injector from the timing fluid discharge passage 505 and the timing passage 507. However, passage 503 could be located at any desired radial position. Like the embodiment of FIG. 4, passages 503 and 505 together form a drain connecting means for removing fuel from the central bore of the injector body 402.

The biasing means in the embodiment of FIGS. 5 and 6 employs a single compression spring 504 rather than the dual extension springs of embodiments 1 and 3. In particular, the outer plunger section 506 is formed as a hollow sleeve including a radially inwardly directed lip 508 located adjacent the inner plunger section 510. In addition to the compression spring 504, the biasing means includes a connecting pin 512 having a shank portion 514 connected at one end to the inner plunger section 510 and extending into the hollow sleeve portion of the outer plunger section 506. The connecting pin 512 further includes an enlarged head 516 at the end remote from the inner plunger section 510. The compression spring 504 is positioned between lip 508 and enlarged head 516. In this embodiment, connecting pin 512 forms part of the inner plunger section 510 such that spring 504 can be considered to be extending "between" the inner and outer plunger sections.

The operation of the unit injector illustrated in FIGS. 5 and 6 should be apparent from the drawings and from the prior description of the operation of the injector illustrated in FIG. 4. In particular, FIG. 5 illustrates on the left hand side of the center line the position of the inner and outer plunger sections when the timing chamber is fully collapsed and the plunger is in its innermost position. On the right hand side of the center line of FIG. 5 the plunger sections are shown at the time that the injection has just been completed and the timing chamber is still expanded. FIG. 6 discloses the corresponding portions of the injector plunger sections when the plunger is in its outermost position. On the left, the position of the plunger sections is shown when the timing chamber is fully collapsed. On the right, the position of the plunger sections is shown when the timing chamber has been expanded.

Figure 7:
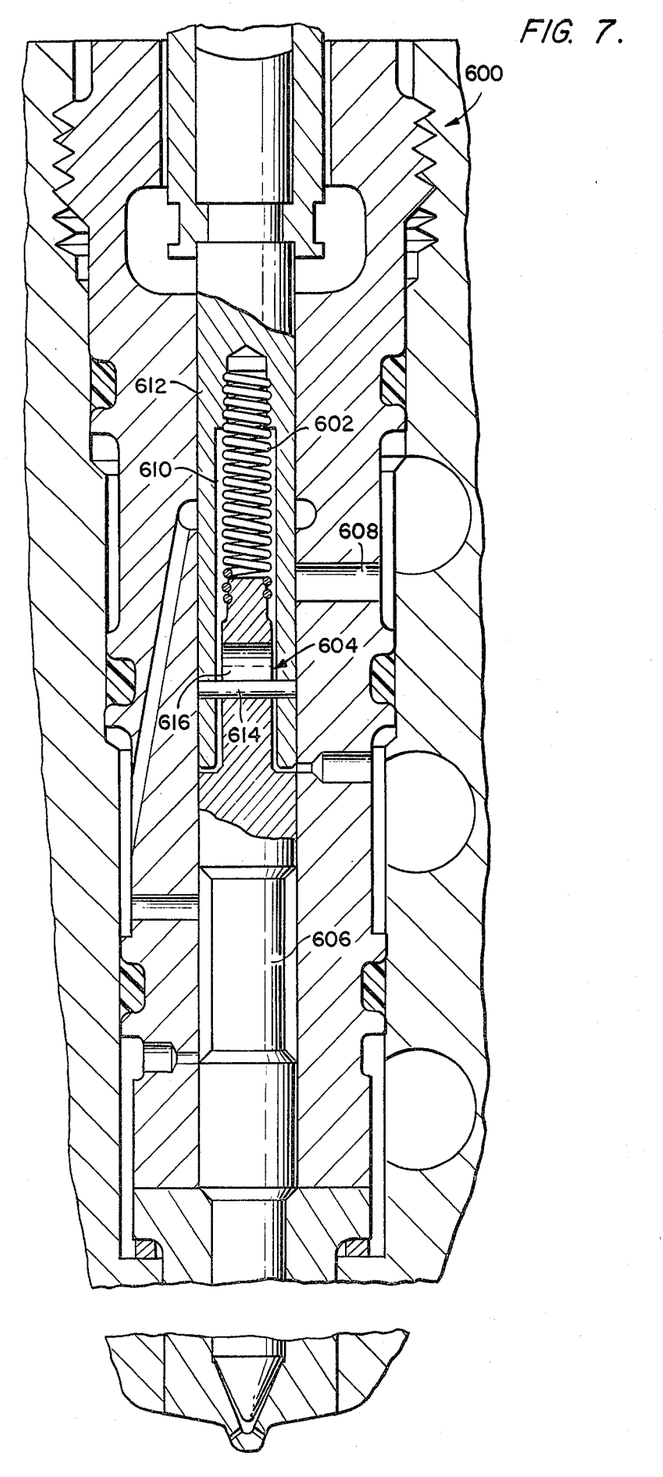
FIG. 7 is a cross-sectional view of still another embodiment of the subject invention similar to the embodiment of FIGS. 5 and 6 in which an extension spring has been substituted for the compression spring and a single lost motion connection means is provided between the inner plunger section and the extension spring.

A final embodiment of the subject invention appears in FIG. 7 in which a unit injector 600 is illustrated similar in operation to the injector of FIGS. 5 and 6. The major difference is that the compression spring of the embodiment of FIGS. 5 and 6 has been replaced by an extension spring 602. A lost motion connection means 604 is also provided between the lower end of extension spring 602 and the inner plunger section 606. Extension spring 602 is arranged to provide a preload tension between the plunger section to overcome dynamic forces and friction. The preload of spring 602 is sufficient to hold the plungers together during the retard mode of operation when only a minimal timing fluid pressure is applied through timing passage 608. When an advance mode of operation is desired, the timing fluid pressure would be increased to fully expand the timing chamber 610 formed between the plunger sections 606 and 612. Unlike the previous embodiments, the plunger sections are prevented from rotating relative to each other by the solid pin 614 which passes through an elongated slot 616 in inner plunger section 606. The ends of extension spring 602 are received in threads formed in plunger sections 606 and 610.

As is apparent from the foregoing, the timing fluid supplied to any of the variable timing embodiments discussed in this disclosure would normally be engine fuel since this would eliminate any problems associated with mixing of dissimilar fluids in the engine drain channel.

| Index to Reference Numbers | |
|---|---|
| 200 | unit injector |
| 202 | injector body |
| 202a | barrel or outer section |
| 202b | cup or inner section |
| 202c | screw threads |
| 203 | recess |
| 203a | hexagonal socket |
| 204 | supply channel |
| 205 | head |
| 206 | drain channel |
| 208 | supply port |
| 210 | drain port |
| 212 | timing channel |
| 214 | timing port |
| 216 | supply flow path |
| 217 | supply connecting means |
| 218 | supply passage |
| 219 | feed orifice |
| 222 | injector plunger |
| 223 | forward end |
| 224 | inner plunger section |
| 226 | outer plunger section |
| 226a | inwardly opening recess |
| 228 | central bore |
| 230 | variable volume timing chamber |
| 232 | timing fluid flow path |
| 234 | annular recess (timing) |
| 236 | annular recess (supply) |
| 238 | annular recess (drain) |
| 240 | drain flow path |
| 241 | circumferential seal |
| 241a | small annular groove |

| -continued | |
|---|---|
| Index to Reference Numbers | |
| 242 | timing fluid connecting means |
| 243 | circumferential seal |
| 243a | small annular groove |
| 244 | timing passage |
| 245 | washer-like element |
| 246 | flow control means |
| 247 | inwardly directed lip |
| 248 | annular groove |
| 248a | cylindrical land |
| 249 | outwardly directed surface |
| 250 | transverse passage |
| 251 | injection orifices |
| 252 | recess |
| 253 | outer circumferential seal |
| 253a | small annular groove |
| 254 | ball type check valve |
| 256 | biasing means |
| 258 | first helical spring |
| 258a | screw threads |
| 258b | screw threads |
| 260 | second helical spring |
| 260a | screw threads |
| 260b | screw threads |
| 262 | lost motion connection means |
| 262a | pin |
| 262b | anchor element |
| 262c | elongated opening |
| 264 | drain connecting means |
| 265 | leakage connecting means |
| 266 | drain passage |
| 266a | restricted portion |
| 268 | radial passages |
| 269 | leakage passage |
| 270 | cam actuated mechanism |
| 270a | arrows |
| 271 | cam lobe |
| 272 | push rod |
| 272e | arrows |
| 273 | rocker arm |
| 274 | link |
| 274e | arrow |
| 275 | plunger return means |
| 276 | sleeve like coupler |
| 277 | lower end |
| 278 | outwardly directed flange |
| 279 | compression spring |
| 280 | one sector |
| 281 | second sector |
| 282 | third sector |
| 283 | fourth sector |
| 284 | raised dimple |
| 300 | injector unit |
| 302 | injector body |
| 304 | supply passage |
| 306 | timing passage |
| 307 | variable length timing chamber |
| 308 | inner plunger section |
| 310 | outer plunger section |
| 312 | dual function drain and discharge passage |
| 314 | leakage passage |
| 316 | first lost motion connection means |
| 316a | pin |
| 316b | anchor element |
| 318 | first extension spring |
| 320 | second lost motion connection means |
| 320a | pin |
| 320b | anchor element |
| 320c | slots |
| 322 | second extension spring |
| 324 | injection cup |
| 400 | unit injector |
| 402 | injector body |
| 404 | innermost recess |
| 406 | middle recess |
| 408 | outer recess |
| 412 | injector plunger |
| 414 | inner plunger section |
| 416 | outer plunger section |
| 418 | annular groove |
| 420 | supply passage |
| 422 | drain passage |

-continued

| Index to Reference Numbers | |
|---|---|
| 422 | timing fluid connecting means |
| 425 | timing passage |
| 426 | timing chamber |
| 428 | timing fluid discharging means |
| 429 | discharge passage |
| 430 | fuel cut off passage |
| 432 | check valve means |
| 434 | leakage connecting means |
| 436 | annular cavity |
| 438 | leakage passage |
| 440 | lost motion connection means |
| 500 | unit injector |
| 502 | injector body |
| 503 | drain passage |
| 504 | compression spring |
| 505 | timing fluid discharge passage |
| 506 | outer plunger section |
| 507 | timing passage |
| 508 | inwardly directed lip |
| 510 | inner plunger section |
| 512 | connecting pin |
| 514 | shank portion |
| 516 | enlarged head |
| 600 | unit injector |
| 602 | extension spring |
| 604 | lost motion connection means |
| 606 | inner plunger section |
| 608 | timing passage |
| 610 | timing chamber |
| 612 | outer plunger section |
| 614 | solid pin |
| 616 | elongated slot |

INDUSTRIAL APPLICABILITY

A miniaturized unit injector designed in accordance with this invention would find application in a very large variety of internal combustion engines. One particularly important application would be for small compression ignition engines adapted for powering automobiles. Lighter truck engines and medium range horsepower engines could also benefit from the use of injectors designed in accordance with the subject invention.

I claim:

1. A fuel injector, comprising
   (a) an injector body containing a central bore and an injection orifice communicating with said central bore;
   (b) an injector plunger mounted for periodic reciprocal movement within said central bore between an innermost position in which said injection orifice is closed and an outermost position in which an injection chamber is formed within the central bore between the inner end of said injector plunger and said injection orifice, said injector plunger including an inner plunger section and an outer plunger section mounted for independent reciprocal movement within said central bore to define a variable volume timing chamber between said plunger sections;
   (c) supply connecting means for providing a pathway for fluid under pressure to flow from a source into the injection chamber;
   (d) timing fluid connecting means for providing a pathway for fluid under pressure to flow from a timing fluid source into said timing chamber to form selectively a hydraulic link between said plunger sections; and
   (e) biasing means for biasing said inner and outer plunger sections together, said biasing means including at least one spring extending between said inner and outer plunger sections to apply a force tending to move said plunger sections together.

2. A fuel injector for use in an injector receiving recess of an internal combustion engine for injecting periodically into a combustion chamber of the engine a portion of the fuel received from a supply port opening into the recess and for returning all the fuel received and not injected to an axially spaced drain port which also opens into the recess and further having a timing port opening into the injector receiving recess for supplying variable pressure timing fluid to the fuel injector, said fuel injector comprising
   (a) an injector body shaped to be inserted into the recess to form a supply flow path extending between the supply port and the exterior surface of said injector body and to form further a drain flow path, isolated from said supply flow path, extending between the drain port and the exterior surface of said injector body and to form still further a timing flow path, isolated from said supply and drain flow paths, extending between the timing port and the exterior surface of said injector body, said injector body including a central bore coaxial with the longitudinal axis of said injector body and an injection orifice located adjacent the inner end of said central bore;
   (b) supply connecting means providing a pathway for fuel under pressure to flow from said supply flow path into said central bore;
   (c) drain connecting means providing a pathway for fuel to flow from the central bore into the drain flow path;
   (d) an injector plunger mounted for reciprocal movement within said central bore between an innermost position in which said injection orifice is closed by the inner end of said injector plunger and an outermost position in which an injection chamber is formed within said central bore between said inner end of said plunger and said injection orifice, said injector plunger includes
      (1) an inner plunger section and an outer plunger section mounted for independent reciprocal movement within said central bore to define a variable volume timing chamber between said plunger sections,
      (2) biasing means for biasing said inner and outer plunger sections together, and
      (3) flow control means for forming a scavenge flow path to cause scavenge flow of fuel through said injector body whenever said injector plunger is less than a first predetermined axial distance from said innermost position and for allowing fuel to be metered into said injection chamber from said supply pathway whenever said injector plunger is more than a second predetermined axial distance from said innermost position; and
   (e) timing fluid connecting means providing a pathway for fluid flow from said timing flow path into said central bore to form selectively a hydraulic link between said plunger sections.

3. An injector as defined in claim 2, wherein said drain connecting means provides a discharge passage for timing fluid to flow from said timing chamber to the exterior of said injector body for a sufficient time during each reciprocal movement of said injector plunger to cause said timing chamber to collapse, said discharge passage including a restriction to cause sufficiently high fluid pressure to develop within said timing chamber during collapse of said timing chamber to hold said inner injector plunger in its innermost position.

4. An injector as defined in claim 2, wherein said drain connecting means includes a drain passage in said injector body communicating with said scavenge flow path for discharging fluid flowing within the scavenge flow path into the drain flow path and a discharge passage contained in said injector body separate from said drain passage for discharging timing fluid into the drain flow path.

5. An injector as defined in claim 4, wherein said outer plunger section includes a hollow sleeve having a radially inwardly directed lip at the end adjacent said inner plunger section and wherein said inner plunger section includes a connecting pin having a shank portion connected at one end to the remaining portion of said inner plunger section and extending into said hollow sleeve, said connecting pin having an enlarged head at the end remote from the remaining portion of said inner plunger section, said biasing means further including a spring extending between said lip and said head.

6. An injector as defined in claim 4, wherein said discharge passage is located axially adjacent the contact point between said inner and outer plunger sections when said injector plunger is in its innermost position.

7. An injector as defined in claim 6, wherein said discharge passage extends from the exterior surface of said injector body to the interior surface of said central bore along a straight radial path perpendicular to the longitudinal axis of said injector body.

8. An injector as defined in claim 7, wherein said drain passage extends from the exterior surface of said injector body to the interior surface of said central bore along a straight radial path perpendicular to the longitudinal axis of said injector body.

9. An injector as defined in claim 2, wherein said injector body includes three axially spaced recesses on the exterior surface shaped to form the supply, drain and timing flow paths, respectively, and further including seal means for forming circumferential seals between said injector body and the recess within which said injector body is designed to be operatively placed in order to isolate fluidically the supply, drain and timing flow paths.

10. An injector as defined in claim 9, wherein said supply connecting means includes a supply passage extending from said central bore to said annular recess forming the supply flow path, wherein said drain connecting means includes a drain passage extending between said central bore and said annular recess forming the drain flow path and said timing fluid connecting means includes a timing passage extending between said central bore and said annular recess forming the timing fluid flow path.

11. An injector as defined in claim 10, wherein said supply passage and said timing passage are formed along respective straight paths perpendicular to the longitudinal axis of said injector body.

12. An injector as defined in claim 11, wherein said drain passage is formed along a straight path which is perpendicular to the longitudinal axis of said injector body.

13. An injector as defined in claims 1, 2, 3 or 4, wherein said timing fluid connecting means includes a timing passage extending from the exterior surface of said injector body to the interior surface of said central bore, said timing passage being axially positioned along said injector body to cause timing fluid to flow into said timing chamber selectively during each reciprocal movement of said injector plunger when the pressure of the timing fluid is sufficient to overcome the force with which said plunger sections are biased together by said biasing means.

14. An injector as defined in claim 13, wherein said supply connecting means includes a straight supply passage contained in said injector body and oriented perpendicularly with respect to the longitudinal axis of said injector body.

15. An injector as defined in claim 14, wherein said flow control means includes an annular groove on the exterior surface of said inner plunger section for forming said scavenge flow path, said annular groove extending axially from said supply passage to said drain passage whenever said injector plunger is in its innermost position, said flow control means further including a cylindrical land cooperating with the interior surface of said central bore to form a seal between said scavenge flow path and said injection chamber.

16. An injector as defined in claim 13, wherein said timing passage forms a straight radial path in said injector body perpendicular to the longitudinal axis of said injector body.

17. An injector as defined in claim 16 for use with an internal combustion engine in which the timing fluid is the same as the fuel supplied to the injector, and further including leakage connecting means providing a pathway for fuel leaked outwardly from said timing chamber to flow into the drain flow path, said leakage connecting means including an annular cavity extending outwardly from said central bore and a leakage passage extending from said annular cavity to the drain pathway.

18. An injector as defined in claim 13, wherein said injector plunger opens and closes said timing passage during each reciprocating cycle of said injector plunger.

19. An injector as defined in claim 18, wherein said outer plunger section opens said timing passage when said outer plunger section is in its outermost position.

20. An injector as defined in claim 1 or 2, further including a plunger return means connected with said outer plunger section for normally urging said outer plunger section toward the outermost position of said injector plunger with a force which is greater at all times than the force of said biasing means.

* * * * *